May 30, 1972  L. R. LEIDY, JR  3,666,336
BEARING
Filed Aug. 18, 1970
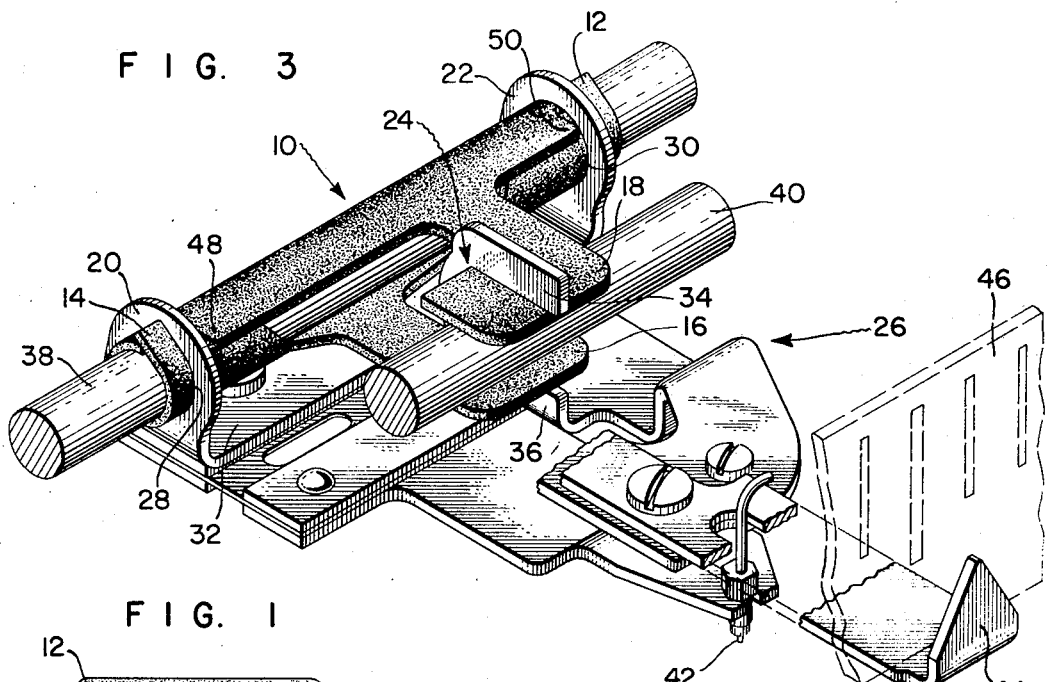
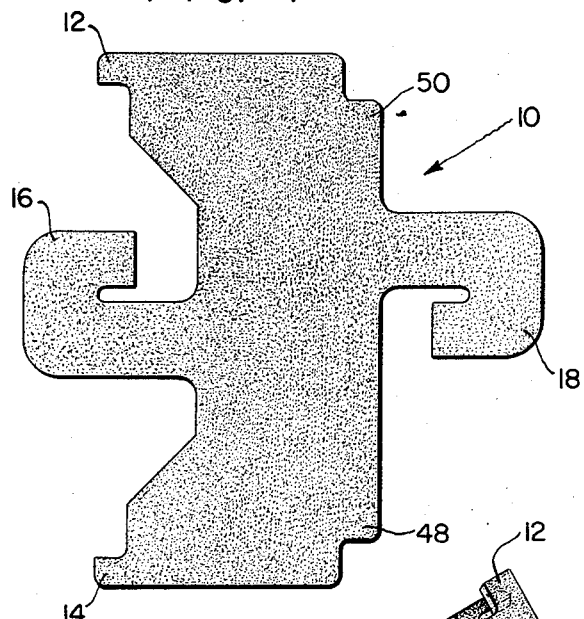
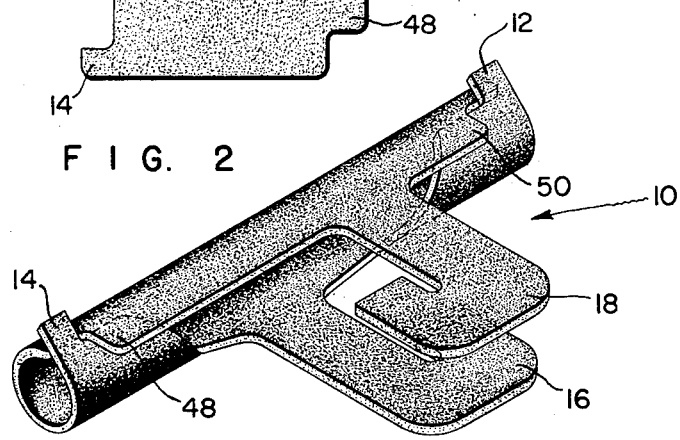
INVENTOR.
LESTER R. LEIDY JR.
BY John Shaw Stevenson
AGENT.

United States Patent Office 3,666,336
Patented May 30, 1972

3,666,336
BEARING
Lester R. Leidy, Jr., Oreland, Pa., assignor to
Honeywell Inc., Minneapolis, Minn.
Filed Aug. 18, 1970, Ser. No. 64,753
Int. Cl. F16c 33/20
U.S. Cl. 308—238
8 Claims

ABSTRACT OF THE DISCLOSURE

A bearing constructed from a resilient sheet having flap portions engageable with portions of a bearing support to retain convoluted parts of the bearing that are loosely mounted on the support from being rotated or moved in a horizontal direction along the support.

It is an object of the present invention to provide an exceptionally low cost unitary bearing that can be easily assembled, retained in and removed from a bearing support.

It is another object of the present invention to disclose a bearing that is comprised of a resilient sheet of bearing material rolled into a single convoluted shaped configuration whose diameter can be reduced by squeezing it when it is desired to have it inserted into or removed from an associated support.

It is another object to provide a bearing of the aforementioned type that can be initially preformed on a mandrel into its convluted shape so that it can be readily assembled and removed from its associated support.

It is another object of the present invention to provide a bearing of the aforementioned type that has flaps on the sides thereof that engage the sides of the support to prevent the bearing when assembled in the support from being moved along its longitudinal axis.

It is another object of the present invention to provide a plurality of interconnected bearings made from a wafer thin single resilient sheet of material that is preferably any suitable commercially available tape bearing material such as glass filled TFE fluor carbon resin and marketed under the trademark "Rulon."

It is another object of the present invention to provide the convoluted bearing with J and L-shaped flaps that engage stationary portions of the support to maintain the bearings mounted in said support in a substantially non-rotatable position therewith.

It is another object of the present invention to utilize portions of said J and L-shaped flaps as another bearing in which another portion of the support can be slidably mounted on a stationary shaft.

More specifically it is another object of the present invention to employ a unitary sheet of the aforementioned bearing material in order to provide three bearings on which a pen carriage support can be mounted for slidable movement on two spaced apart shafts that extend across the recording and indicating faces of an indicating recorder.

A better understanding of the present invention may be had from the following detailed description when read in connection with the accompanying drawings in which:

FIG. 1 is a view showing the pattern that is employed for the unique bearing;

FIG. 2 shows the sheet of bearing material in a preformed single convoluted shape before assembly and FIG. 3 illustrates a typical way of employing the sheet of bearing material between three support portions of a pen carriage and also shows the associated shafts along which the pen carriage is slidably engaged.

FIG. 1 shows the unique pattern formed in the sheet 10 which may be made of any suitable resilient bearing material of uniform thickness.

A bearing material that has been found to be satisfactory is .010" thick glass filled TFE fluor carbon resin which is marketed under the trademark "Rulon."

The aforementioned resilient sheet bearing 10 is preformed or manually rolled by hand into its single convolute form as shown in FIG. 2. FIGS. 1 and 2 also shows flap portions 12, 14 extending from opposite ends of the resilient bearing as well as two portions 16, 18 that are of a J and L-shaped configuration that protrudes from the central portion of the bearing 10.

By way of illustration FIG. 3 shows how bearing 10 is assembled on its associated support portions 20, 22 and on the C-shaped support portion 24 of the pen carriage 26.

The bearing 10 as shown in FIG. 2 is assembled in the form as shown in FIG. 3 by inserting the left and right ends of the bearing 10 through the apertured wall portions 28, 30 that are formed in the bearing supports 20, 22. These supports 20, 22 are shown in FIG. 3 as being of a single piece construction and interconnected by a common base portion 32. It can be seen that the J and L-shaped portions 16, 18 are placed in between the top and bottom portions 34, 36 of the C-shaped portion 24 that extends in an upward direction from the base portion 32 of the pen carriage 26.

The pen carriage guide rods 38, 40 are then passed through the aforementioned support portions 20, 22, 24 of the bearing 10 that is mounted on the carriage 26.

The ends of the guide rods 38, 40 extend to the right and left sides of the portions shown and are retained in a well known manner in the side walls of a recording casing, not shown.

It can be seen from FIG. 3 that the front end of the slidable carriage 26 has a conventional pen 42 for engaging a chart, not shown, and a conventional indicating pointer 44 for traversing a scale 46 as the carriage 26 is moved between the right and left ends of the guide rods 38, 40.

As shown in FIG. 3 the inherent resiliency of the bearing 10 will force the flaps 12 and 14 away from the shaft 38 into contact with the outermost sides of the bearing supports 20, 22 and thereby prevent the bearing 10 from moving from the position shown in FIG. 3 as the carriage is moved along the shaft 38 in a direction that is either to the right or left of the position shown.

It should be noted that the protruding portions 48, 50, also assists in longitudinally retaining the bearing in support portions 20, 22.

When the rod 38 is assembled in the bearing 10 the flaps 12, 14 and protruding portions 48, 50 will thereby be prevented from moving longitudinally through the apertured walls 28, 30 of support 20, 22.

It can also be seen that since the bearing support portions 34, 36 of the C-shaped portion 24 and the J and L-shaped bearing portions 16 and 18 are prevented by the carriage shaft 40 from rotating about shaft 38 the bearing 10 that is wrapped about this shaft 38 will therefore be prevented from rotating as the carriage is moved in either direction along the shaft 38.

The aforementioned J and L-shaped flap portions 16, 18 of the bearing 10 engage the vertical opposite sides of the C-shaped portion 24 of the carriage 26 and assist the other flap portions 12 and 14 in their task of preventing the bearing 10 from being moved to the right or left of its assembled position on the pen carriage as shown in FIG. 3.

The embodiments of the invention in which an exclusive property or privilege is claimed are defined as follows:

1. A readily replaceable unitary bearing means, and a bearing support means, comprising a resilient sheet of bearing material that is of a single convoluted shaped configuration, the inherent resilient characteristics of said bearing means readily adapting it to be manually inserted and retained in physical contact with the surface of said bearing support means and wherein each of the opposite ends of said convolution from separate portions of the bearing that are adapted to be brought into physical contact with the outer and inner side portions of the bearing support means.

2. A readily replaceable unitary bearing means, and a bearing support means, comprising a resilient sheet of bearing material that is of a single convoluted shaped configuration, the inherent resilient characteristics of said bearing means readily adapting it to be manually inserted and retained in physical contact with the surface of said bearing support means and wherein said single convoluted bearing has flap portions on opposite sides of the bearing support means that are adapted to retain said bearing in a substantially fixed position along its longitudinal axis.

3. The bearing means are defined in claim 1 wherein said separate bearing portions are constructed of two flaps that are respectively of a J and L-shaped configuration to retain the bearing in non rotatable contact between a C-shaped portion of said bearing support means.

4. The bearing means as defined in claim 1 wherein said separate bearing portions are constructed of flaps formed on its outer ends that are adapted to engage said support means and thereby retain said bearing in a substantially fixed position along its longitudinal axis and wherein said single convoluted bearing has two additional flap portions that are adapted to retain the bearing in non rotatable contact with said bearing support means.

5. The bearing means as defined in claim 1 wherein the bearing is provided with a pair of flap portions that extend outwardly from a part of said bearing that is positioned between said separate bearing portions into non rotatable engagement with another portion of the bearing support means.

6. The bearing means as defined in claim 1 wherein the bearing means is provided with a pair of flap portions that extend outwardly from a part of said bearing that is positioned between said separate bearing portions and into non rotatable engagement with another portion of the bearing support means and wherein the flap portions provide a third bearing portion.

7. The bearing means as defined in claim 1 wherein said bearing means is provided with a pair of flap portions that extend outwardly from a part of said bearing that is positioned between said separate bearing portions and into non rotatable engagement with another portion of the bearing support means to provide a third bearing portion and wherein the last mentioned portion of the bearing support means is of a C-shaped configuration and said flap portions are respectively of a J and L-shaped configuration that are retained in hooked surface to surface engagement against the opposite vertical side portions of the C-shaped bearing support.

8. The bearing means as defined in claim 1 wherein the bearing is provided with a pair of flap portions that extend outwardly from a part of said bearing that is positioned between said separate bearing portions and into non rotatable engagement with another portion of the bearing support means and wherein the separate bearing portions at the opposite ends of the bearing have the same longitudinal axis, said last mentioned bearings are positioned for sliding engagement along a first shaft and said flaps being positioned for sliding engagement along a second shaft whose longitudinal axis is parallel to said first shaft.

References Cited

UNITED STATES PATENTS 2,865,691   12/1958   Muller _____ 308—238

MARTIN P. SCHWADRON, Primary Examiner

B. L. GROSSMAN, Assistant Examiner